United States Patent [19]
Lu

[11] Patent Number: 6,081,716
[45] Date of Patent: Jun. 27, 2000

[54] WIRELESS PRIVATE BRANCH EXCHANGE

[75] Inventor: Priscilla M. Lu, San Carlos, Calif.

[73] Assignee: Interwave Communications, Inc., Menlo Park, Calif.

[21] Appl. No.: 09/287,514

[22] Filed: Apr. 7, 1999

Related U.S. Application Data

[63] Continuation of application No. 09/231,329, Jan. 13, 1999, and a continuation-in-part of application No. 09/049,606, Mar. 27, 1998, which is a continuation of application No. 08/434,598, May 4, 1995, Pat. No. 5,734,979, and a continuation-in-part of application No. 09/229,771, Jan. 13, 1999.

[60] Provisional application No. 60/071,075, Jan. 15, 1998.

[51] Int. Cl.[7] .............................. H04Q 7/20; H04M 1/00
[52] U.S. Cl. ........................................... 455/445; 455/555
[58] Field of Search ..................................... 455/445, 554, 455/555, 560, 422

[56] References Cited

U.S. PATENT DOCUMENTS

| | | | |
|---|---|---|---|
| 5,544,227 | 8/1996 | Blust et al. | 455/445 |
| 5,751,789 | 5/1998 | Farris et al. | 455/554 |

*Primary Examiner*—Nguyen Vo
*Attorney, Agent, or Firm*—Flehr Hohbach Test Albritton & Herbert LLP

[57] ABSTRACT

An apparatus and method enabling private branch exchanges (PBXs) to increase their communication capacity in a cost efficient manner by communicating over a wireless interface. The wireless private branch exchange comprises a handset transceiver station (HTS) coupled to a private branch exchange (PBX) connected to a plurality of terminals. During inbound information processing the wireless communication network transmits inbound information to the wireless PBX. The inbound information transmitted by the wireless communication network is received by the HTS. The HTS decodes the inbound information, performs protocol conversion from GSM format to ISDN format and then forwards the inbound information to the PBX. The PBX then routes the inbound information to the appropriate terminal. During outbound information processing the HTS receives outbound information from the PBX. The HTS performs protocol conversion from ISDN to GSM, and encodes the outbound information. The outbound information is then transmitted by the HTS over a wireless interface to the wireless communication network. The wireless communication network then routes the outbound information to the destination external telephone network terminal. Exemplary embodiments are provided for use with the Global Systems for Mobile Communication (GSM) protocol and can be applied to other digital technologies

8 Claims, 3 Drawing Sheets

WIRELESS PRIVATE BRANCH EXCHANGE

RELATED APPLICATIONS

This application is a continuation of U.S. Ser. No. 09/231,329 filed on Jan. 13, 1999, pending, claiming priority to U.S. Prov. No. 60/071,075 filed on Jan. 15, 1998; a continuation-in-part of U.S. Ser. No. 09/049,606 filed on Mar. 27, 1998, pending, which is a continuation of U.S. Ser. No. 08/434,598 filed May 4, 1995, now U.S. Pat. No. 5,734,979; and a continuation in part of U.S. Ser. No. 09/229,771 filed on Jan. 13, 1999, pending, claiming priority to U.S. Prov. No. 60/071,584 filed on Jan. 15, 1998, all incorproated herein by reference.

FIELD

The present invention relates to a wireless private branch exchange. In particular, the invention relates to a system and method to enable private branch exchanges to communicate with external telephone networks using a wireless communication network, to increase communication capacity of the private branch exchange in a cost efficient manner.

BACKGROUND

With the ever increasing importance of communication services, both speech and data, there is a rapidly growing need for providing economically cost efficient means of communication. The conventional public telephone service, usually known as public switched telephone network (PSTN) or wireline telephony, remains the predominant communication network used by millions of users around the world. Wireline telephony allows two users to communicate with each other only if there is a physical wire connection between the two users. The necessity of a physical connection between users imposes several restrictions on users of PSTN systems.

First, the capacity of users that a PSTN can service at a given time is restricted by the number of physical lines existing between users. Hence, the capacity of a PSTN can be increased only by installing/laying new lines to support additional users—a solution that is very expensive and time consuming. As a result, the capacity of a PSTN is usually capped by economic considerations. It would therefore be highly desirable to have a communication network whose capacity can be increased in a cost efficient manner.

Another problem with existing PSTN systems is the manner in which new lines are laid, usually below the ground. This involves extensive digging of roads and property. In many instances, this is not a viable option. This is especially true in populated urban areas like cities and suburbs where the demand for communication services is very high but there is very little land available for laying new PSTN lines. Furthermore, since PSTN lines stretch out over long distances between users, their maintenance is very expensive and time consuming. Thus, there is a need for a communication system which not only increases the communication capacity but is also easy to install and maintain.

The above-mentioned problems and restrictions of wired PSTN systems have a major impact on commercial establishments such as offices and hotels which require large communication capacity. A majority of these commercial establishments use private branch exchanges (PBXs) to handle their call processing needs. A PBX is generally a telephone exchange serving a single organization, for example, an office building having a switchboard and associated equipment, usually located on the user's premises. A PBX is generally connected to a plurality of private internal telephone users (called terminals) located in a typical office environment. The PBX provides for internal call switching between one or more of these terminals. The PBX is also connected to external telephone networks via PSTN lines. The PBX uses the PSTN lines to perform call routing between a PBX terminal and an external telephone network terminal.

As the commercial establishment served by the PBX grows in size, it frequently becomes desirable to increase the external communication capacity of the PBX at a reasonable expense. However, since the PBX is linked to fixed capacity physical PSTN lines, an increase in capacity is possible only by installing additional PSTN lines. As mentioned earlier, in most circumstances this option is prohibitively expensive and impractical. Consequently, the external calling capacity of these PBXs is forcibly limited to the number of existing PSTN physical links. It would therefore be desirable to provide a system for increasing the capacity of existing PBXs in a cost efficient and practical manner.

The advent of wireless telephony (or mobile communication) technology has sought to solve some of the restrictions posed by wired PSTN networks by decoupling the telephone from its wires. In a wireless communication network, for example GSM, the telephone is substituted by a mobile station (MS) or a handset. The geographical area serviced by the cellular network is divided in cells—each cell being served by a base transceiver station (BTS). Information is exchanged between the mobile station and the BTS over a radio interface. The BTS in turn communicates with a mobile services switching center (MSC) which performs the basic switching function in the wireless network. The MSC also acts as a gateway between the wireless network and other external communication networks—performing interconnectivity and switching functions between GSM and the other external telephone networks.

Although wireless telephony removes the restriction of wires, it has its own share of problems. First, a mobile station is quite expensive when compared to an ordinary telephone. Thus, it is not always economically feasible to replace a telephone with a mobile station. This is especially important for businesses and other commercial establishments which have existing PSTN telephone networks connected to PBXs. Replacing the entire existing PSTN base with a wireless network is not cost efficient. Second, many functions provided by the private branch exchange are not supported by wireless telephone services. It would therefore be desirable if the commercial establishments could retain their existing PSTN based PBX systems and also take advantage of the available wireless technology.

SUMMARY

The present invention relates to a wireless private branch exchange. In particular, the invention relates to a system and method to enable a private branch exchange to increase its capacity in a cost efficient manner by communicating with external telephone networks using a wireless communication network. Exemplary embodiments are provided for use with the Global Systems for Mobile Communication (GSM) protocol and can be applied to other cellular communication and digital technologies.

A wireless private branch exchange comprises a handset transceiver station (HTS) coupled to a private branch exchange serving a plurality of terminals. During inbound information processing the handset transceiver station receives inbound information transmitted by the wireless communication network. The handset transceiver station decodes the inbound information and performs protocol conversion from a GSM format to an ISDN format supported by the PBX. The inbound information is then forwarded to the PBX which routes it to an appropriate terminal.

During outbound information processing the handset transceiver station receives outbound information from the PBX to be routed to an external telephone network terminal. The handset transceiver station converts the outbound information from ISDN format to GSM format. The handset transceiver station then encodes the outbound information and transmits it to the wireless communication network. The outbound information is then routed by the wireless communication network to the destination external telephone network terminal.

In one embodiment, the HTS comprises an antenna, a receiver, a transmitter, a processor and a protocol converter. The receiver receives inbound information and the transmitter transmits outbound information. The processor is coupled to the receiver and transmitter and is responsible for decoding inbound information and encoding outbound information. The protocol converter is responsible for information format conversions between GSM and ISDN.

In one embodiment of the invention, the PBX is connected to the HTS and also to an external PSTN network via a physical link. In this embodiment, the PBX is configured to route the call over the radio interface only if the wired PSTN interface is already operating at full capacity. This allows the PBX to make optimal use of existing PSTN links and the wireless interface.

In another embodiment of the invention, the concurrent capacity of the wireless private branch exchange can be increased by using a plurality of HTSs, each with their own receive and transmit cycles. The ability to add additional HTSs as and when required provides the PBX administrator with an easy and cheap way to increase the communication capacity of the PBX.

Advantages of the invention include the ability to increase the communication capacity of a PBX without the need to install additional PSTN lines. Furthermore, in one embodiment of the invention the PBX can make optimal use of existing PSTN links and the wireless interface. Since the equipment required for the present invention is localized at the user's site, it is easy to install and maintain. The present invention provides the PBX user with the flexibility to increase the capacity of the PBX when required.

BRIEF DESCRIPTION OF THE DRAWINGS

Additional features, aspects and advantages of the present invention will be more readily apparent from the following detailed description and appended claims when taken in conjunction with the drawings, in which:

DESCRIPTION

The present invention relates to a wireless private branch exchange. In particular, the invention relates to a system and method to enable private branch exchanges to increase their communication capacity in a cost efficient manner by communicating with external telephone networks using a wireless communication network. Exemplary embodiments are provided for use with the Global Systems for Mobile Communication (GSM) protocol and can be also applied to other wireless communication and digital technologies.

The present invention is described with reference to various embodiments incorporating specific configurations and protocols. Those skilled in the art will appreciate that various changes and modifications can be made to the embodiments while remaining within the scope of the present invention. For purposes of this description, the term information includes voice, data or both.

Figure 1:
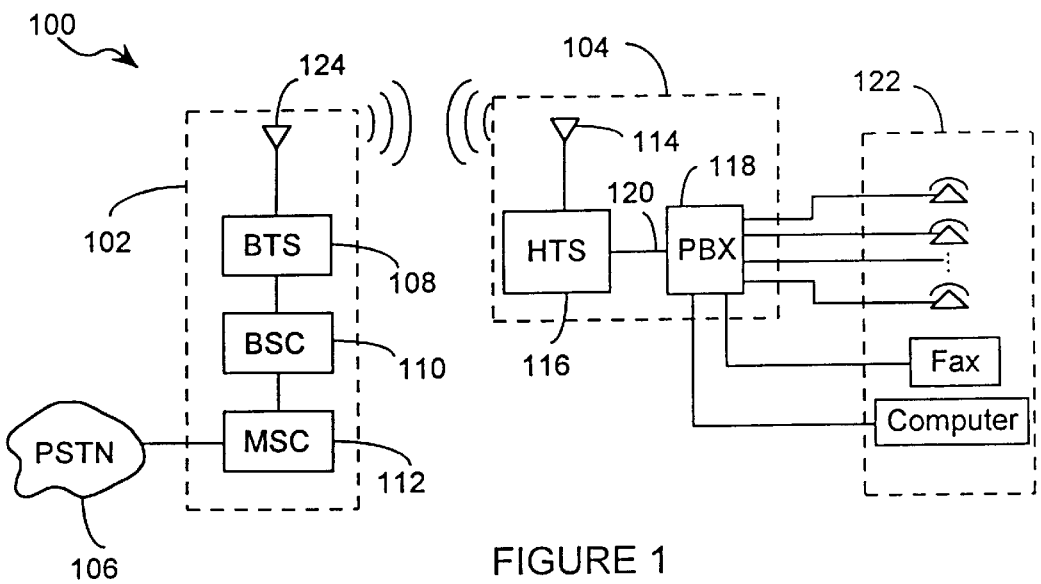
FIG. 1 depicts an exemplary telephone network incorporating the present invention.

Referring to FIG. 1, there is shown an exemplary telephone network 100 incorporating the present invention. A wireless communication network 102 using the GSM protocol communicates with a wireless private branch exchange 104 via the radio interface. The wireless communication network 102 is a conventional wireless network including a base transceiver station 108 (BTS) connected to a base station controller 110 (BSC), which in turn is connected to a mobile services switching center 112 (MSC). In a typical wireless network, BTS 108 using antenna 124 communicates via a wireless interface with mobile stations or handsets which provide an interface through which end users can access the wireless network. In the telephone network 100 depicted in FIG. 1, the mobile stations or handsets are replaced by the wireless private branch exchange 104. MSC 112 acts as a gateway between the wireless communication network 102 and external telephone networks 106. Thus, MSC 112 is responsible for providing interconnectivity between the wireless network 102 and other external networks 106. An overview of GSM is described in the U.S. Pat. No. 5,781,582 incorporated herein by reference.

The wireless private branch exchange 104 comprises an antenna 114, a handset transceiver station 116 (HTS) and a private branch exchange 118 (PBX) connected to a plurality of terminals 122. Terminals 122 serviced by PBX 118 include telephones, fax terminals, and computers. PBX 118 supports functions performed by conventional PBX systems, such as call routing, call redirection, call forwarding, and call waiting. In the embodiment depicted in FIG. 1, PBX 118 supports the ISDN protocol and is coupled to HTS 116 via ISDN link 120. However, in alternate embodiments PBX 118 can also support other telephone network protocols known to those skilled in the art.

HTS 116 emulates the functions of a typical mobile station. HTS 116 therefore enables PBX terminals 122 to communicate with external telephone networks 106 over a wireless interface. In general, information processing performed by the present invention can be classified into inbound information processing and outbound information processing. Inbound information processing refers to the steps involved in communicating inbound information from an external telephone network terminal to a terminal serviced by PBX 118. Outbound information processing refers to the steps involved in communicating outbound information from a terminal connected to PBX 118 to an external telephone network terminal.

HTS 116 receives outbound information from PBX 118 and transmits it to BTS 108 over a radio interface via antenna 114. Similarly, HTS 116 receives inbound information from BTS 108 over the radio interface via antenna 114 and forwards the received inbound information to PBX 118. In this manner, PBX 118 can communicate with external telephone networks 106 over a wireless network without the need for physical PSTN connections between the terminals of PBX 118 and the external telephone network terminals.

Inbound Information Processing

Figure 2:
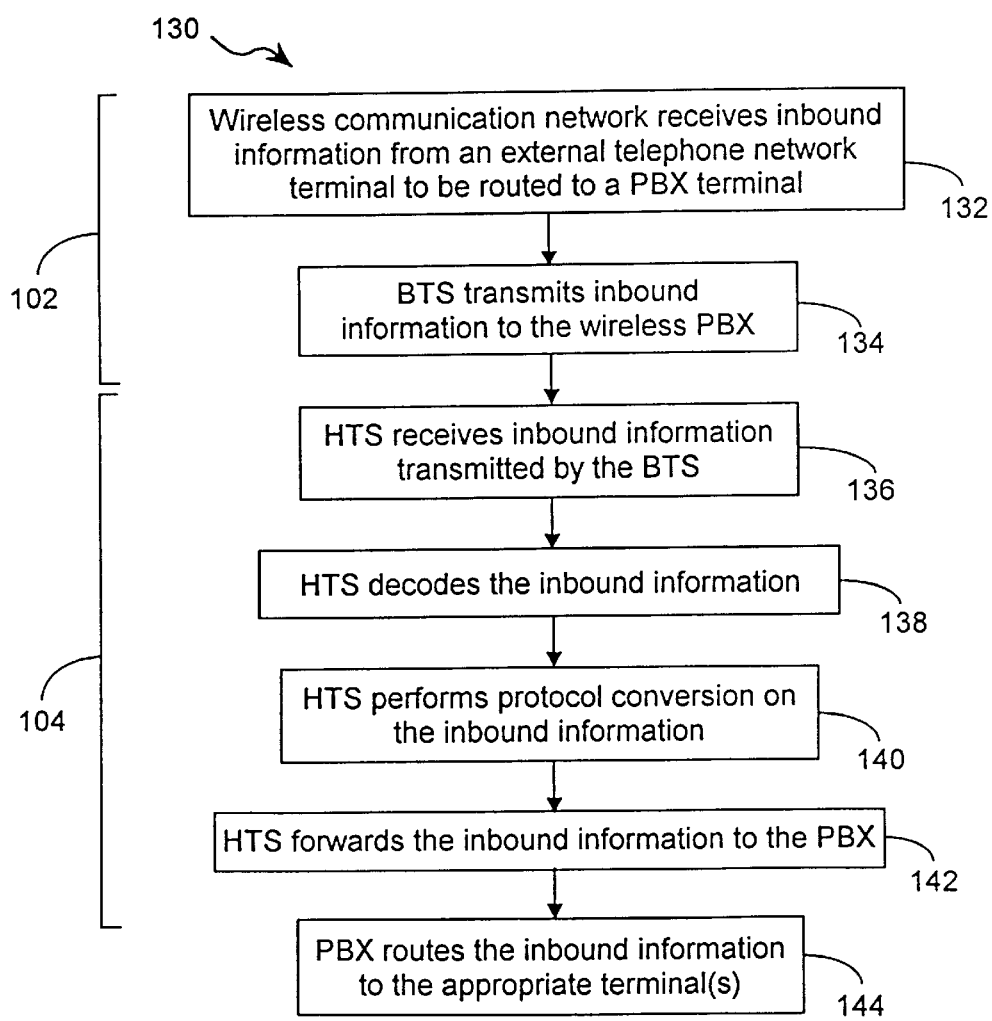
FIG. 2 is a flowchart showing the steps involved in inbound information processing for an embodiment of the invention.

FIG. 2 depicts a flowchart 130 showing the steps involved in inbound information processing for an embodiment of the invention. As shown in FIG. 2, inbound information processing is initiated at step 132 when MSC 112 receives inbound information from an external telephone network terminal which is to be forwarded to one or more terminals serviced by PBX 118. In order to route the inbound information to the appropriate BTS, MSC 112 has access to a subscriber information database which contains a list of all mobile stations that are supported by that particular MSC. As mentioned earlier, in this embodiment of the invention the wireless private branch exchange emulates a mobile station. Consequently, all terminals 122 of PBX 118 are mapped to the same subscriber entry in the subscriber information database. MSC 112 uses destination information contained in the inbound information to locate the subscriber database entry corresponding to wireless private branch exchange 104. MSC 112 then routes the inbound information to BTS 108 which is responsible for communicating with wireless private branch exchange 104. At step 134, BTS 108 transmits the inbound information to wireless private branch exchange 104.

At step 136, HTS 116 of wireless private branch exchange 104, receives inbound information transmitted by BTS 108. At step 138, HTS 116 decodes the inbound information. Since the GSM information format is different from the ISDN information format supported by PBX 118, at step 140, HTS 116 converts the inbound information from a GSM format to an ISDN format. In one embodiment, the data format used to transmit data to a PSTN is used to transmit data from HTS 116 over an ISDN 120. For more information on protocol conversion from GSM to ISDN refer to M. Mouly, *The GSM System for Mobile Communications*, Chapter 3, pg. 140–142 (1992) (International Standard Book Number 2-9507190-0-7). After performing the GSM to ISDN protocol conversion, at step 142, HTS 116 forwards the inbound information to PBX 118. At step 144, PBX 118, uses the destination information contained in the inbound information to route the inbound information to the appropriate terminal(s). This completes the inbound information processing process.

Outbound Information Processing

Figure 3:
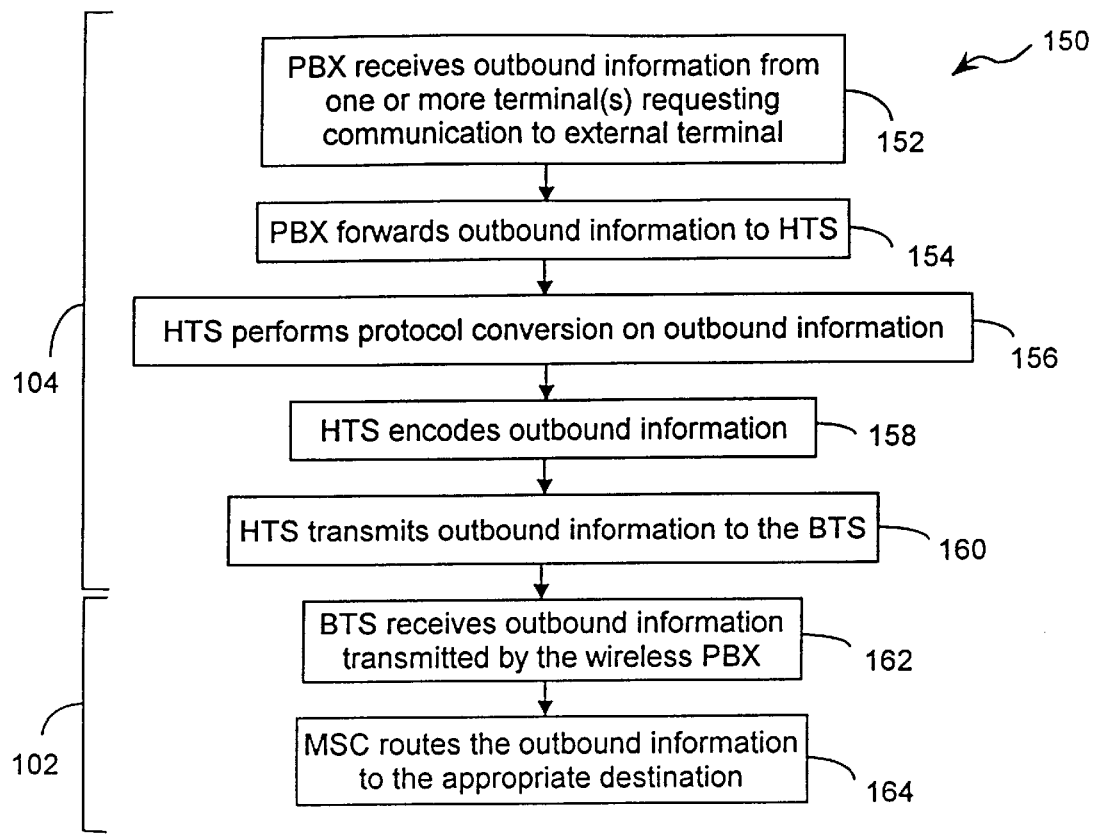
FIG. 3 is a flowchart showing the steps involved in outbound information processing for an embodiment of the invention.

FIG. 3 depicts a flowchart 150 showing the steps involved in outbound information processing for an embodiment of the invention. As shown in FIG. 3, outbound information processing is initiated at step 152 when PBX 118 receives a request from one or more of its terminals 122 requesting outbound information to be communicated to an external telephone network terminal. At step 154, PBX 118 forwards the outbound information to HTS 116. As mentioned earlier, the information received from PBX 118 is in ISDN format which needs to be converted to the GSM format before it can be transmitted via the wireless interface. At step 156, HTS 116 converts the outbound information from ISDN format to GSM format. In one embodiment, the data format used to transmit data to a PSTN is used to transmit data over an ISDN 120 to HTS 116. For more information on ISDN to GSM protocol conversion, refer to M. Mouly, *The GSM System for Mobile Communications*, Chapter 3, pg. 140–142 (1992).

At step 158, HTS 116 encodes the outbound information and prepares it for transmission. At step 160, HTS 116 uses antenna 114 to transmit the encoded outbound information via the radio interface to BTS 108. At step 162, BTS 108 receives the outbound information transmitted by HTS 116. The outbound information is then routed via BSC 110 to MSC 112. Depending on the destination information contained in the outbound information, in step 164 MSC 112 performs the necessary inter-networking functions and routes the outbound information to the appropriate external telephone network terminal. This concludes the outbound information processing process.

Figure 4:
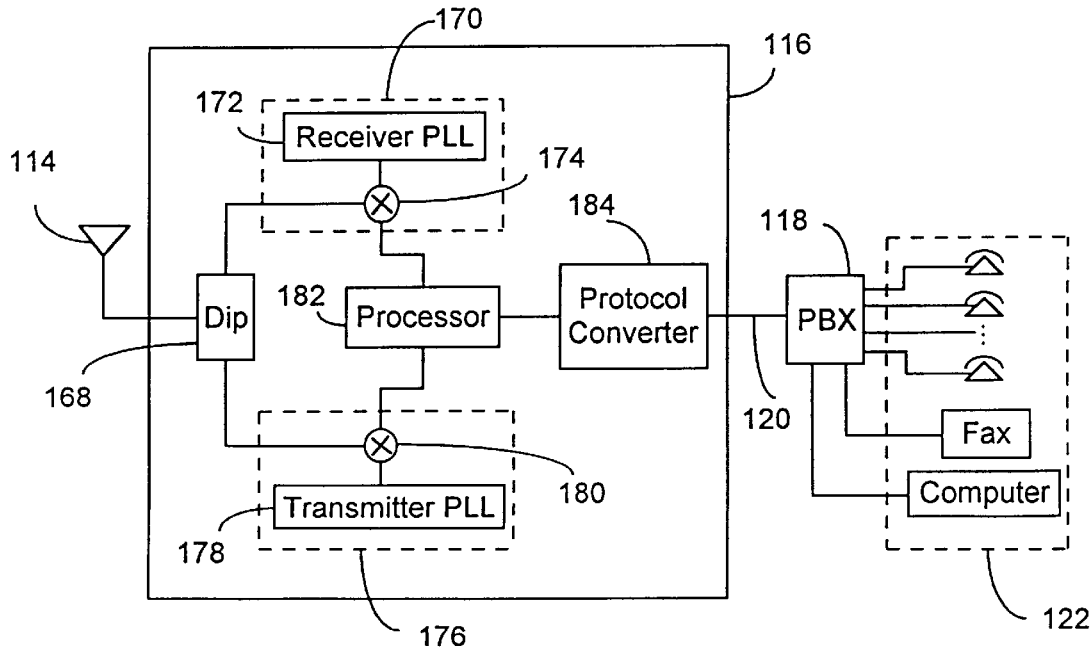
FIG. 4 is a block diagram depicting the internal structure of a handset transceiver station for an embodiment of the invention.

FIG. 4 is a block diagram depicting the internal structure of HTS 116 in accordance with one embodiment of the present invention. As shown in FIG. 4, HTS 116 comprises an antenna 114, a diplexer 168, a receiver 170, a transmitter 176, a processor 182 and a protocol converter 184. Antenna 114 is used both for receiving inbound information transmitted by BTS 108 and for transmitting outbound information to BTS 108. A common antenna 184 can be used for both reception and transmission of information since the transmit frequency band of the GSM wireless communication network is disjoint from the receive frequency band. For GSM communication, each of the frequency bands occupies approximately 25 MHz, with the GSM transmit frequency band approximately in the range of 890–915 MHz and the receive frequency band approximately in the range of 935–960 MHz. Antenna 114 is connected to receiver 170 and transmitter 176 via diplexer 168.

Receiver 170 is responsible for receiving the inbound information transmitted by BTS 108 during inbound information processing. This corresponds to step 136 in FIG. 2. Receiver 170 comprises a receiver synthesizer 172 and a receiver mixer 174. Receiver synthesizer 172 is programmed to generate the receive frequency for HTS 116 which corresponds to the transmit frequency of BTS 108. On receiving the inbound information using antenna 114, synthesizer 172 provides the information frequency to receiver mixer 174, which down-mixes the received signal and provides the inbound information signal to processor 182.

Transmitter 176 is responsible for transmitting outbound information to BTS 108 during outbound information processing. This corresponds to step 160 in FIG. 3. Transmitter 176 comprises a transmitter synthesizer 178 and a transmitter mixer 180. Transmitter synthesizer 178 is programmed to generate the transmit frequency for HTS 116 which corresponds to the receive frequency of BTS 108. Transmitter synthesizer 178 provides the frequency to transmitter mixer 180, which up-mixes the outbound information signal received from the processor 182 and provides a radio frequency signal to be transmitted to BTS 108 via antenna 114.

Processor 182 is coupled to receiver 170, transmitter 176 and protocol converter 184. Processor 182 is responsible for decoding the inbound information signal (corresponding to step 138 in FIG. 2) and for encoding the outbound information signal (corresponding to step 158 in FIG. 3) to be transmitted to BTS 108 via the antenna. Protocol converter 184 forms the boundary between the GSM domain and the ISDN domain supported by PBX 118. Protocol conversion is required for interconnecting the GSM domain to the ISDN domain. This is accomplished by protocol converter 184 which converts inbound information from GSM format to ISDN format (corresponding to step 140 in FIG. 2) and outbound information from ISDN format to GSM format (corresponding to step 156 in FIG. 3). For further details on protocol conversion between ISDN and GSM refer to M. Mouly, *The GSM System for Mobile Communications*, Chapter 3, pg. 140–142 (1992). It should be apparent to those skilled in the art that the scope of protocol converter 184 is not restricted to GSM-ISDN conversions. Conversions between other telecommunication protocols known in the art are also within the scope of the invention.

Protocol converter 184 is connected to PBX 118 via ISDN link 120. Protocol converter 184 uses link 120 to forward inbound information to PBX 118 (corresponding to step 142 in FIG. 2) and to receive outbound information from PBX 118 (corresponding to step 154 in FIG. 3). PBX 118 is connected to a plurality of terminals 122 including but not restricted to telephones, fax machines, and computers. As mentioned earlier PBX 118 supports functions performed by typical prior art PBX systems, such as call routing, call redirection, call forwarding, and call waiting.

Alternate Embodiments

Figure 5:
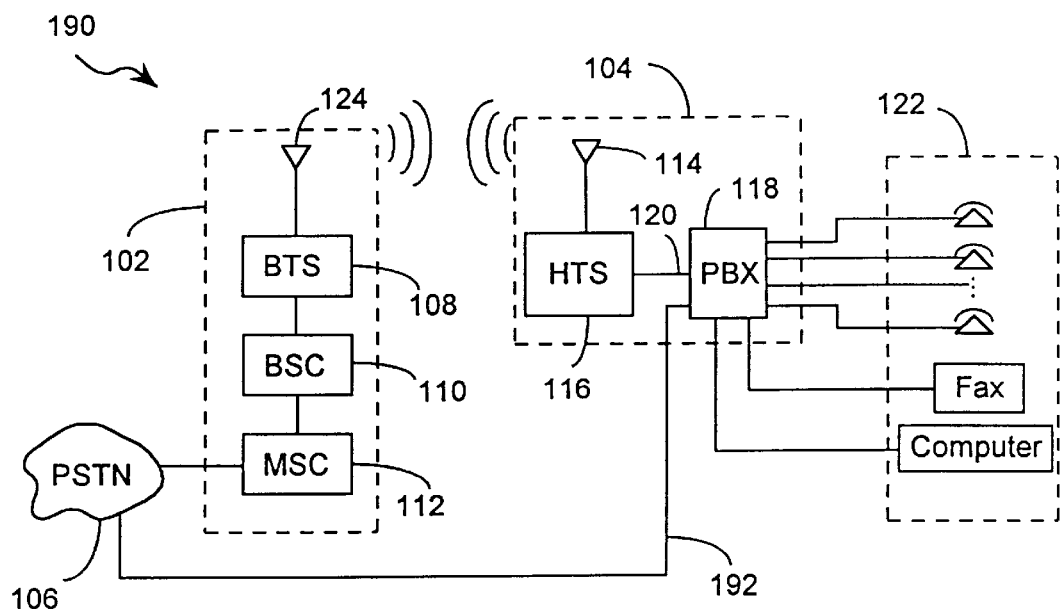
FIG. 5 depicts an alternate embodiment of the present invention.

FIG. 5 depicts telephone network 190 incorporating an alternate embodiment of the present invention. As depicted in FIG. 5, PBX 118 is not only connected to HTS 116 but is also connected to an external PSTN network 106 via physical link 192. This setup is typically found in establishments which have an already existing PSTN base but want to further increase the capacity of the PBX using the wireless communication capability. In this configuration, PBX 118 has a choice of using wired PSTN interface 192 or the wireless radio interface for communicating with external telephone networks. Since the cost of communication over a wired interface is cheaper than using a wireless interface, it is desirable that PBX 118 make use of the wireless interface only if the wired PSTN interface 192 is operating at full capacity and is unable to handle any more PBX call requests. In essence, PBX call requests exceeding the PSTN capacity are routed over the wireless interface.

Thus, in this embodiment, PBX 118 is configured to first attempt to make a connection using the wired PSTN interface. If the PSTN interface is already operating at full capacity and the call request cannot be successfully completed, then PBX 118 routes the connection request via the wireless interface. In this manner PBX 118 not only maximizes the PSTN network usage but also allows for increased capacity using the wireless interface. This optimal use of the existing wired PSTN services and wireless services translates to substantial cost savings. It should be apparent to those skilled in the art that various implementations of this embodiment are possible without departing from the true scope of the invention.

Figure 6:
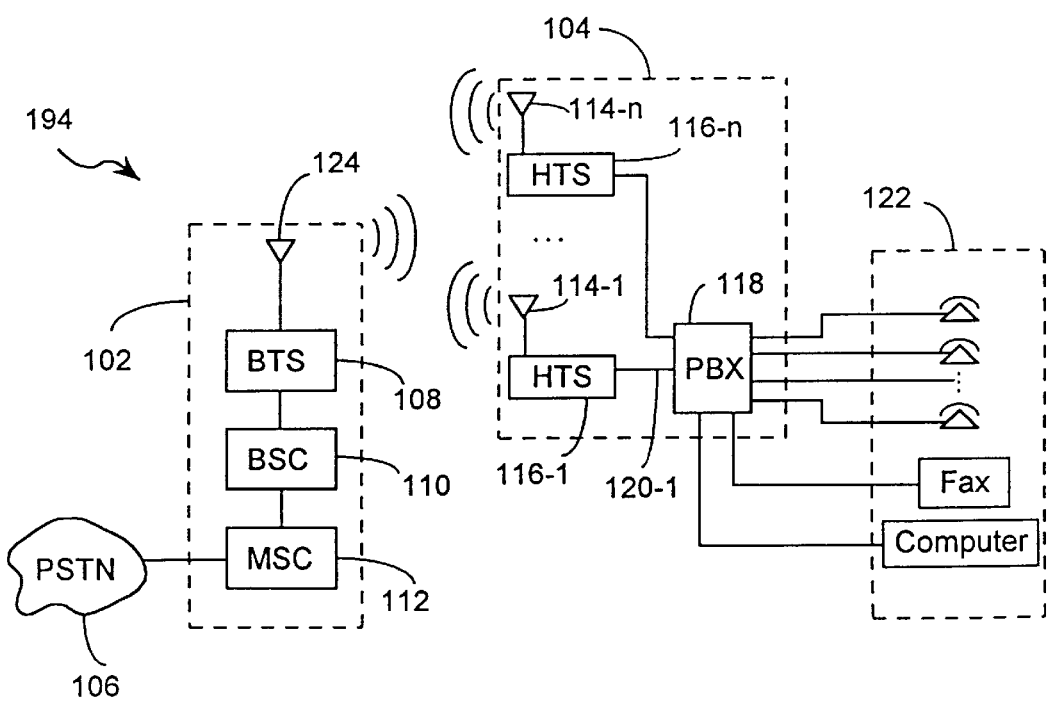
FIG. 6 depicts another alternate embodiment of the present invention.

FIG. 6 depicts a telephone network 194 incorporating another alternate embodiment of the present invention. As depicted in FIG. 6, PBX 118 is connected to a plurality of HTSs 114-1 to 114-n. For a given HTS, the number of PBX terminal connections that can be concurrently maintained over the wireless interface depends on the number of time slots that make up a GSM frame. A typical GSM frame comprises eight time slots. Therefore, a wireless private branch exchange comprising a single HTS can support up to eight connections simultaneously over the wireless interface.

A convenient way to increase the number of connections is to increase the number of handset transceiver stations. As depicted in FIG. 6, instead of one HTS per wireless private branch exchange, PBX 118 is connected to a plurality of HTSs with their own respective receive and transmit frequencies. Since each HTS can support up to eight connections, the addition of each additional HTS increases the capacity of the PBX by eight connections. Thus, the PBX capacity can be easily increased as and when required by simply increasing the number of HTSs connected to PBX 118.

Conclusion

Advantages of the invention include the ability to increase the communication capacity of a PBX without the need to install additional PSTN lines. This translates to substantial savings in costs which would otherwise have to be incurred in installing additional PSTN lines. It provides commercial establishments with a cost efficient way to increase their communication bandwidth.

The invention further reduces costs by maximizing the usage of the cheaper wired communication interface before routing the connection requests over the wireless interface. The invention thus allows for optimal use of the wired PSTN and wireless radio interfaces.

As explained above, the capacity of a wireless PBX can be increased quite easily by connecting additional HTSs to the PBX. This offers the PBX administrator great flexibility in regulating the total capacity of the PBX network.

Unlike prior art PSTN systems where the physical PSTN lines stretch out for long distances between users, the physical equipment components utilized in the present invention are localized at the PBX site. Consequently, installation and maintenance of the invention is simple and cheap.

While the present invention has been described with reference to a few specific embodiments, the description is illustrative of the invention and is not to be construed as limiting the invention. Various modifications may occur which are obvious to those skilled in the art while remaining within the true spirit and scope of the invention as defined by the appended claims.

What is claimed is:

1. A wireless private branch exchange for communicating with a wireless communication network having a base transmission station, said wireless private branch exchange comprising:

a handset transceiver station including:

(a) a receiver configured to receive inbound information from said base transmission station on a receive frequency;

(b) a transmitter configured to transmit outbound information to said base transmission station on a transmit frequency;

(c) a processor coupled to said receiver and said transmitter, said processor configured to decode said inbound information and to encode said outbound information to communicate with said base transmission station; and (d) a protocol converter coupled to said processor, said protocol converter configured to translate said inbound information from a wireless communication format to a private branch exchange format and to translate said outbound information from said private branch exchange format to said wireless communication format;

a private branch exchange coupled to said handset transceiver station and a public switched telephone network, wherein said private branch exchange is configured to communicate said inbound information with said handset transceiver station and to communicate said outbound information with said handset transceiver station, and to route a predetermined amount of information through said public switched telephone network before routing information through said wireless communication network; and a plurality of terminals coupled to said private branch exchange.

2. The wireless private branch exchange transceiver station of claim 1, wherein:

said processor is configured to selectively route information over said wireless communication network and said public switched telephone network in order to minimize a cost associated with routing said information.

3. The wireless private branch exchange transceiver station of claim 2, wherein:

said information includes telephone calls.

4. The wireless private branch exchange transceiver station of claim 1, wherein:

said inbound and said outbound information comprises speech and data.

5. A method of communicating between a wireless communication network having a base transceiver station and a wireless private branch exchange having a receiver, a transmitter, a processor, a protocol converter and a private branch exchange connected to a plurality of terminals, said method comprising the steps of:

receiving inbound information from said base transceiver station using said receiver;

transmitting outbound information to said base transceiver station using said transmitter;

decoding said inbound information and encoding said outbound information using a processor coupled to said receiver and said transmitter;

converting said inbound information from a wireless communication format to a private branch exchange communication format using a protocol converter;

converting said outbound information from said private branch exchange communication format to said wireless communication format using said protocol converter;

communicating with a public switched telephone network using said private branch exchange; and routing a predetermined amount of information through said public switched telephone network before routing information through said wireless communication network using said private branch exchange.

6. The method of claim 5, wherein:

said routing step over said wireless communication network and said public switch telephone network is selectively made in order to minimize a cost associated with routing said information.

7. The method of claim 5, wherein:

said information includes telephone phone calls.

8. The method of claim 5, wherein:

said receiving inbound information step comprises receiving data and voice information; and said transmitting outbound information step comprises transmitting data and voice information.

* * * * *